US012421728B2

(12) United States Patent
Grønbæk

(10) Patent No.: US 12,421,728 B2
(45) Date of Patent: Sep. 23, 2025

(54) ROOF WINDOW, A KIT WITH A COVERING ASSEMBLY, AND A METHOD FOR MOUNTING A ROOF WINDOW

(71) Applicant: VKR Holding A/S, Hørsholm (DK)

(72) Inventor: Kristian Strand Grønbæk, Gedved (DK)

(73) Assignee: VKR Holding A/S (DK)

( * ) Notice: Subject to any disclaimer, the term of this patent is extended or adjusted under 35 U.S.C. 154(b) by 0 days.

(21) Appl. No.: 18/850,014

(22) PCT Filed: Mar. 31, 2023

(86) PCT No.: PCT/DK2023/050087
§ 371 (c)(1),
(2) Date: Sep. 23, 2024

(87) PCT Pub. No.: WO2023/186250
PCT Pub. Date: Oct. 5, 2023

(65) Prior Publication Data

US 2025/0109594 A1 Apr. 3, 2025

(30) Foreign Application Priority Data

Mar. 31, 2022 (DK) ........................... PA 2022 70170

(51) Int. Cl.
*E04D 13/03* (2006.01)
*E04D 13/147* (2006.01)
*E06B 7/23* (2006.01)

(52) U.S. Cl.
CPC ..... *E04D 13/1475* (2013.01); *E04D 13/0305* (2013.01); *E06B 7/2312* (2013.01); *E04D 13/031* (2013.01)

(58) Field of Classification Search
CPC ....... E04B 7/18; E04D 13/03; E04D 13/0305; E04D 13/031; E04D 13/0315;
(Continued)

(56) References Cited

U.S. PATENT DOCUMENTS 4,589,238 A * 5/1986 Sampson ............ E04D 13/0305 52/200
4,702,049 A * 10/1987 Sampson ............ E04D 13/0305 52/200
(Continued)

FOREIGN PATENT DOCUMENTS

EP 2354360 A1 * 8/2011 ........... E04D 13/031

OTHER PUBLICATIONS

International Search Report issued in connection with International Application No. PCT/DK2023/050087.
(Continued)

*Primary Examiner* — Kyle J. Walraed-Sullivan
(74) *Attorney, Agent, or Firm* — Merek, Blackmon & Voorhees, LLC

(57) ABSTRACT

A roof window (1) comprising a frame (2), a sash (3) carrying a pane (4), where the frame (2) comprises an interface unit (8) extending in the length direction (L) of at least one frame member (21, 22, 23, 24). At least one flashing member (1011, 1012, 1013, 1014) comprises a flange (1017) inserted in a flashing reception groove (85) in the interface unit (8) in a direction parallel to the frame plane (F), said flashing reception groove (85) extending in the length direction (L) of the frame member (21, 22, 23, 24). One or more protrusions (**85*a*) are provided in the flashing reception groove for engagement with the flange(s) (1017) and extend(s) in the length direction (L) and is/are made by co-extrusion with one or more parts (80, 86, 88) of the interface unit (8**) delimiting the flashing reception groove. A method for mounting a roof window is also disclosed.

21 Claims, 7 Drawing Sheets

(58) Field of Classification Search
CPC ... E04D 13/032; E04D 13/0325; E04D 13/14; E04D 13/1407; E04D 13/147; E04D 13/1473; E04D 13/1475; E04D 13/035; E04D 13/0351; E04D 13/0352; E04D 13/0354; E06B 2001/628; E06B 7/26
See application file for complete search history.

(56) References Cited

U.S. PATENT DOCUMENTS

| | | | | | |
|---|---|---|---|---|---|
| 4,703,592 | A * | 11/1987 | Sampson | E04D 13/0305 | 52/20 |
| 4,896,468 | A * | 1/1990 | Sampson | E04D 13/0305 | 52/200 |
| 5,046,292 | A * | 9/1991 | Sampson | E04D 13/0305 | 52/200 |
| 5,148,643 | A | 9/1992 | Sampson et al. | | |
| 5,150,983 | A * | 9/1992 | Bogenhagen | E06B 3/9725 | 403/402 |
| 5,199,234 | A * | 4/1993 | Guhl | E04D 13/0315 | 52/72 |
| 5,355,644 | A * | 10/1994 | Guhl | E04D 13/1415 | 52/200 |
| 5,357,720 | A * | 10/1994 | O'Keeffe | E04D 13/0315 | 52/200 |
| 5,522,189 | A * | 6/1996 | Mortensen | E04D 13/031 | 52/537 |
| 5,553,425 | A * | 9/1996 | Sampson | E04D 13/0315 | 52/745.15 |
| 5,682,713 | A * | 11/1997 | Weiss | E04D 13/031 | 403/231 |
| 5,913,785 | A * | 6/1999 | Moeller | E04D 13/0305 | 52/220.8 |
| 6,195,948 | B1 * | 3/2001 | Lamanna | E04D 13/0305 | 52/60 |
| 6,263,623 | B1 * | 7/2001 | Weiss | E04D 13/0305 | 52/200 |
| 6,295,774 | B1 * | 10/2001 | Lindgren | E04D 13/031 | 52/204.1 |
| 6,826,267 | B2 * | 11/2004 | Daum | H04L 12/2818 | 379/102.01 |
| 2004/0139669 | A1 * | 7/2004 | Feucht | E04D 13/031 | 52/204.5 |
| 2007/0062132 | A1 * | 3/2007 | Kristensen | E04D 13/0354 | 52/209 |
| 2009/0031640 | A1 | 2/2009 | Elmes et al. | | |
| 2009/0107066 | A1 * | 4/2009 | O'Leary | E04B 1/625 | 52/293.3 |
| 2012/0167483 | A1 * | 7/2012 | Lindgren | E04D 13/0315 | 52/745.21 |
| 2012/0240491 | A1 * | 9/2012 | Voegele, Jr. | E04D 13/0315 | 52/200 |
| 2015/0267412 | A1 * | 9/2015 | McClure | E04B 7/02 | 52/745.06 |
| 2021/0198894 | A1 * | 7/2021 | Jacobsen | E04D 13/031 | |

OTHER PUBLICATIONS

Written Opinion issued in connection with International Application No. PCT/DK2023/050087.

International Preliminary Report on Patentability issued in connection with International Application No. PCT/DK2023/050087.

* cited by examiner

ROOF WINDOW, A KIT WITH A COVERING ASSEMBLY, AND A METHOD FOR MOUNTING A ROOF WINDOW

TECHNICAL FIELD

The present invention relates to a roof window configured for being mounted in a roof structure comprising a roofing material, said roof window comprising a frame and a sash carrying a pane, where the frame comprises a plurality of frame members together defining a frame opening and a frame plane and each frame member extends in a length direction, where the frame comprises an interface unit extending in the length direction of at least one frame member, and where the interface unit comprises a flashing reception groove configured for receiving a flange of at least one flashing member via a groove opening by insertion in a direction parallel to the frame plane, said flashing reception groove extending in the length direction of the frame member.

BACKGROUND ART

When installing windows in a roof structure of a building it is necessary to make an opening in the roof structure and subsequently to re-establish the weatherproofing of the building otherwise provided by the roof structure. For this purpose, the joint between the roof window and the roof structure is covered by covering assembly including flashing and cladding members. To achieve the best possible weatherproofing, it is essential that the covering assembly is mounted correctly and that it subsequently stays in place, even during heavy winds and when affected by big temperature variations.

Traditionally, flashing members have been L-shaped having a first leg for extending upwards along an outer side of the frame away from the roof structure and a second leg for extending outwards over the roof structure away from the frame, and such flashing members have been mounted by arranging them close to the frame of the roof window and then lowering them into contact with the roof structure, i.e. in a direction perpendicular to the frame plane. This requires that the frame of the roof window projects sufficiently high over the roof structure for the first leg to have a surface to engage with and that the roof structure provides a support surface for the second leg so that the flashing members ends up in the desired position relative to the frame.

It has also been attempted to provide flashing members with flanges engaging with a flashing reception groove provided directly in a frame member or in an interface unit on the frame. This may for example allow the first leg to be shorter and may contribute to ensuring that the second leg is located in the intended height relative to the frame plane. After mounting, the engagement between the flange and the flashing reception groove may also help prevent the flashing member from any substantial movement in the height direction, i.e. perpendicular to the frame plane, and prevent it from turning about an axis extending in parallel to the frame plane and perpendicular to the length axis. With prior art flashing members, the latter may for example happen if the support surface is insufficient and pressure is applied to the second leg of the flashing member, for example during maintenance or repair work on the roof structure or as a result of heavy snow or wind, and it may result in untightness due to gaps forming between flashing members.

The correct mounting of covering assemblies, however, continues to be a challenge, particularly when roof windows are mounted deep in the roof structure, and a faulty connection between the roof window and the covering assembly may result in water penetration and serious damages to the roof structure.

SUMMARY OF INVENTION

With this background, it is therefore an object of the invention to provide a roof window configured for an improved connection with a covering assembly and an improved method for mounting a roof window.

This and further objects are achieved with a roof window of the kind mentioned in the introduction which is furthermore characterised in that one or more protrusions are provided in the flashing reception groove for engagement with the flange(s), and that the protrusion(s) is/are made by co-extrusion with one or more parts of the interface unit delimiting the flashing reception groove.

The one or more protrusions provided in the flashing reception groove may seal against the flange(s) thereby contributing to the water tightness of the connection between roof window and the covering assembly. In addition, or alternatively, the protrusion(s) may provide friction against the flange(s) thereby hindering or preventing a mutual movement, and helping to keep the flashing member(s) in place once mounted. Thereby the need to fixate the flashing member once mounted, for example by attaching it to the frame using nails or staples, can be eliminated.

In the following, reference will be made primarily to embodiments having more than one protrusion but is it to be understood that a single protrusion may in principle be sufficient. Likewise, whenever reference is made to a single flange or a single flashing member, it is to be understood that unless other stated more may be involved.

The protrusions may for example be in the form of lips extending over the entire length of the flashing reception groove, but local or brush-like protrusions may also be employed. It is presently considered advantageous that the protrusion(s) extend(s) in the length direction.

The protrusions are preferably made from a material allowing them to yield when coming into engagement with the flange, preferably from an elastic material, whereas the parts delimiting the flashing reception groove are preferably made from a dimensionally stable material, so that they maintain their shape during insertion of the flange.

The flashing reception groove will usually have the overall cross-sectional shape perpendicular to the length direction of a rectangle, being delimited by an upper wall, a lower wall, and a side wall forming a closed end of the flashing reception groove opposite the groove opening. It is, however, to be understood that the flashing reception groove could also have a rounded end or be partially open at the end, and the upper and lower walls do not have to be parallel or straight. Here, as well as in the following, the indications "upper" and "lower" refer to the relative positions in the mounted state of the roof window. The same applies to any other indication of relative direction or position given below.

By the protrusion(s) being made by co-extrusion with one or more parts of the interface unit delimiting the flashing reception groove, they form a coherent structure, preferably a monolithic structure, ensuring that protrusions are not dislocated, lost, or forgotten, as might be the case if using a separate sealing gasket.

In one embodiment, the protrusion(s) is/are made from a material having a Shore A hardness of 20 A-95 A, preferably 35 A-87 A. This provides a good balance between ease of insertion of the flange and reliable retainment of the flange.

It is presently considered advantageous that the flange can be inserted by hand without the use of tools, and care must be taken that the resistance to insertion does not result in deformation of the flashing member. The strength of the material used for the flashing member must therefore be factored in when choosing the material for and the dimensions of the protrusions. Factors such as the number of protrusions, the size of the protrusions, the position of the protrusions, and the friction between the materials used for the flashing member and the protrusions, may also be factored in.

In one embodiment, each protrusion extends over more than half of the height of the flashing reception groove measured perpendicular to the frame plane.

Thermoplastic elastomers (TPE) are presently considered advantageous for the protrusion(s), and it is presently considered advantageous that the parts of the interface unit delimiting the flashing reception groove are made of polypropylene (PP) mixed with glass fibres. The glass fibre content may for example be 15% by weight of the total material, so that the polypropylene constitutes 85% by weight of the total material. Experiments have shown that the combination of TPE and PP works well for coextrusion, but other combinations are also possible. Particularly, other polymers can be considered, and the use of polyvinylchloride (PVC) mixed with different amounts or types of additives, such as softeners or foaming agent, to achieved different properties of the protrusions and the parts delimiting the flashing reception groove is presently considered promising. It is also possible to use metals, such as aluminium for the parts delimiting the flashing reception groove.

Protrusions may be arranged so that they are provided either over the flange or under the flange inside the flashing reception groove or both. In one embodiment, there is at least three protrusions, and one or more protrusion(s) extend(s) from each of two opposite sides of the flashing reception groove, such as from an upper wall and a lower wall delimiting the flashing reception groove. In this way, protrusions engage the flange from both sides, and three points of contact provide a stable support for the flashing member.

If the protrusions are made from an elastic material, the protrusions on either side may yield to a different degree, thereby potentially compensating for a slight displacement of the flange in a direction perpendicular to the frame plane, during insertion and/or in the mounted state, for example due to thermal expansion or wind loads. Elastic protrusions may also contribute to guiding or moving the flange and consequently the flashing member into a desired position.

At least one protrusion may have a tapered cross-sectional shape with a minor dimension at a free edge, i.e. having a larger dimension where it is attached to the parts delimiting the flashing reception groove. This entails that protrusion has a larger resistance to bending at the attachment to the parts delimiting the flashing reception groove than at the free edge, and that the outermost part of the protrusion, closest to the free edge will therefor yield the most during insertion of the flange.

In one embodiment at least one protrusion is inclined in a direction away from the groove opening, i.e. being non-perpendicular to the frame plane, thereby facilitating and/or guiding insertion of the flange. In one embodiment, several protrusions are inclined in a direction away from the groove opening, and the inclination decreases with the distance from the groove opening. An innermost protrusion closest to the end of the flashing reception groove may be without such an inclination and thus extend perpendicular to the frame plane.

The total thickness of the flange(s) inserted into the flashing reception groove, possibly including sections of the diverter rail, preferably constitutes less than 50% of the height of the flashing reception groove measured perpendicular to the frame plane, preferably less than 25% of the height of the flashing reception groove measured perpendicular to the frame plane. The thickness may depend on the material used for the flashing members and on the number of layers of material inserted in the flashing reception groove. A typical material used for flashing members is aluminium with a layer thickness of 0.4 mm to 0.7 mm, resulting in total thickness of 1.2 mm to 2.1 mm if three flanges overlap. In some cases, one or more flanges may also comprise a folded material, possibly enclosing another element. With the percentages given above, these dimensions would mean that the flashing reception groove would advantageously have a height of the 2.5 mm to 10 mm, but to facilitate insertion of the flashing members it is presently preferred that the flashing reception groove has a height a direction perpendicular to the frame plane of at least 4 mm, preferably at least 5 mm, more preferred at least 6 mm. Heights of the flashing reception groove of up to 15 mm are presently envisaged.

The interface unit may further comprise one or more sealing lips, which are preferably made by co-extrusion with one or more parts of the interface unit and/or made from the same material as the protrusion(s).

In a second aspect of the invention the object is achieved with a kit comprising a roof window as described above and a covering assembly comprising a plurality of flashing members configured for covering a joint between the frame and the roof structure, where at least one flashing member comprises a flange configured for insertion in the flashing reception groove in a direction parallel to the frame plane.

To facilitate mounting of the flashing member, the flange may comprise a marking indicating an intended insertion depth of the flange into the flashing reception groove. During mounting, the displacing of the flashing member is continued until the flange is inserted so deep into the flashing reception groove that the marking reaches or is hidden by the interface unit. The marking may for example be a printed indication on the flange but may also be in the form of perforations on the flange. Perforations may have the added advantage of reducing heat transfer via the flange. It is also possible to provide a click-function providing an audio and/or tactile feed-back when proper insertion of the flange has been achieved.

In one embodiment, the at least one flashing member is a top flashing member, the flange of which extends into the flashing reception groove of a top element of the interface unit, and wherein the top flashing member comprises a corner section at one or both ends seen in the length direction, said corner section extending along a side frame member of the frame in the mounted state. Such top flashing members, only without the flange are well-known in the prior art, and can generally be described as having the shape of an inverted U embracing the upper part of the roof window in the mounted state, upper referring to the uppermost part when seen in direction of inclination of the roof structure. The advantage of such a top flashing member is that there are no joints between flashing members at the upper corners of the roof window and that the corner sections ensure that the top flashing member is mounted correctly in a transverse direction. With the flange now also being provided, the top flashing member is further kept in position in a height direction, thus further facilitating installation as described above.

To further facilitate installation and keep the top flashing member in place once mounted, the corner section may comprise a corner flange extending into the flashing reception groove of a side element of the interface unit. The corner flange is inserted into the flashing reception groove of a side element of the interface unit by displacement perpendicular to the length direction of the top flashing member as the top flashing member is displaced towards the top frame member. This will help to prevent the top flashing member from turning about its length direction, thereby helping to keep it in tight contact with a side flashing member arranged below it in the direction of inclination of the roof structure and possibly also a roof material or an underroof arranged above it.

A top flashing member of the type described above may be made by deep drawing whereby the top flashing member itself can be without joints, thus further reducing the risk of leaks.

The considerations presented with respect to the top flashing member also applies to a bottom flashing member.

In a third aspect of the invention, the object is achieved with a method for mounting a roof window in a roof structure comprising a roofing material, said roof window comprising a frame, a sash carrying a pane, and said frame comprising a plurality of frame members together defining a frame opening and a frame plane and each extending in a length direction, wherein said method comprises the steps of A) arranging the roof window in an opening in the roof structure, B) arranging a plurality of flashing members of a covering assembly so that they cover a joint between the frame of the roof window and the roof structure, characterised in that during step B) a flange of at least one flashing member is inserted in a flashing reception groove in an interface unit on the frame by displacing the flashing member in a direction parallel to the frame plane, said interface unit and said flashing reception groove extending in the length direction of the frame member.

Embodiments and advantages described with reference to one aspect of the invention also apply to the other aspects of the invention and vice versa. To avoid undue repetition, they have not been described with reference to each aspect.

BRIEF DESCRIPTION OF DRAWINGS

In the following description, embodiments of the invention will be described with reference to the schematic drawings, in which.

DESCRIPTION OF EMBODIMENTS

Figure 1:
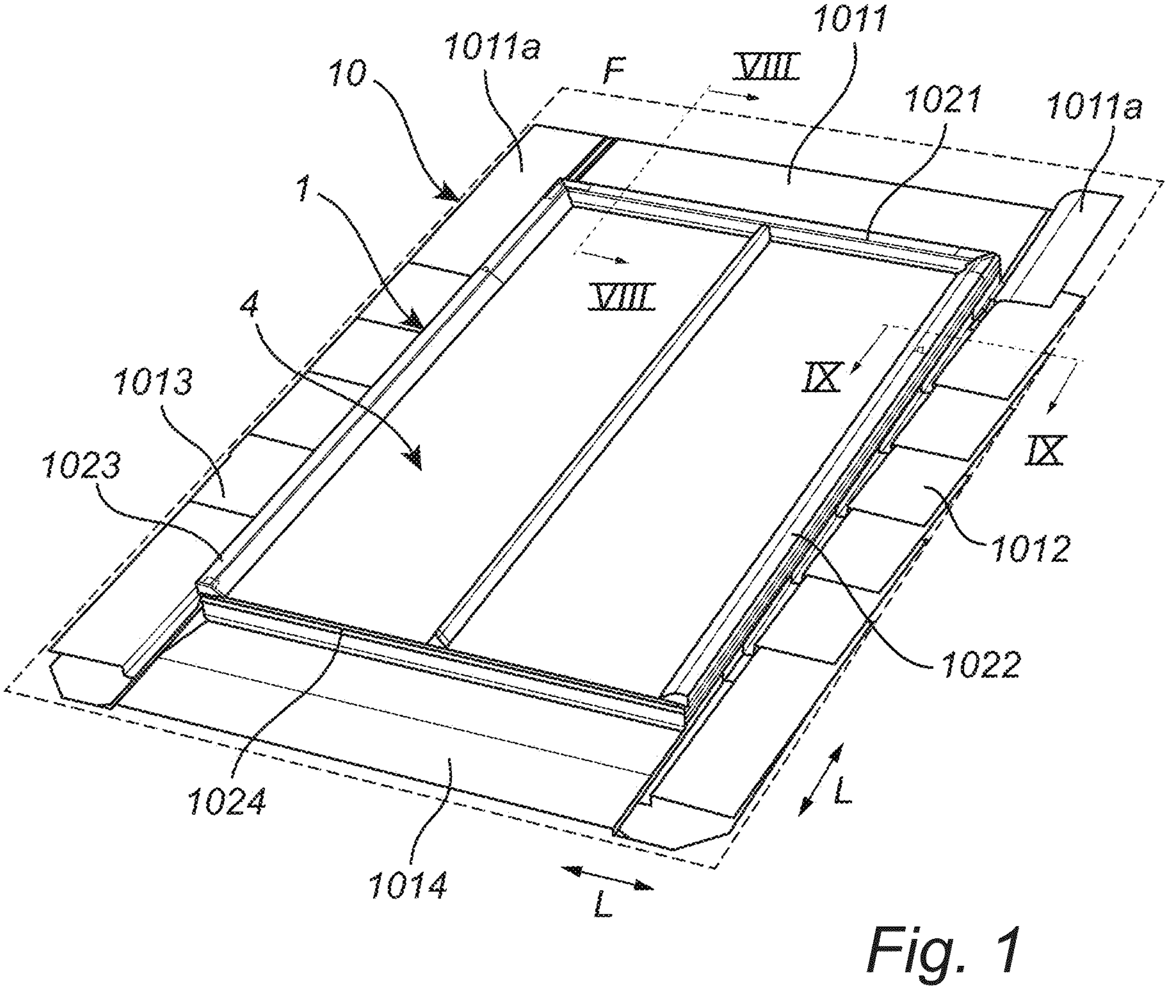
FIG. 1 is a perspective view of a roof window with a covering assembly.

Referring initially to FIG. 1, a roof window 1 is shown with a covering assembly 10, wherein the right-hand side of the top flashing member 1011 is shown in a state of delivery, before adaptation to the shape of a roofing material 112 used alongside the roof window 1 as will be explained later. The roof window 1 is shown in an inclined position as it is intended for being mounted in an inclined roof structure 11.

In addition to the top flashing member 1011, the covering assembly comprises a plurality of side flashing members 1012, 1013, a bottom flashing member 1014 and a plurality of cladding members 1021, 1022, 1023, 1024 each covering a part of the sash 3 carrying the pane 4.

The roof window 1 comprises a frame (not visible in FIG. 1), and the top flashing member 1011, the side flashing members 1012, 1013, and the bottom flashing member 1014 extend in a respective length direction L along top, side, and frame members, respectively. The frame members 21, 22, 23, 24 together defining a frame opening covered by the pane 4 and a frame plane F.

In the embodiment in FIG. 1, the top flashing member 1011 comprises a corner section 1011*a* at each end, said corner section extending along a side of the roof window 1 and overlapping with a flashing member 1012, 1013. The top flashing member 1011 may thus be said to have the shape of an inverted U embracing the upper part of the roof window 1 when mounted in an inclined roof structure, i.e. the part being arranged uppermost when seen in the direction of inclination of the roof structure (cf. also FIGS. 2, 3 and 6).

The cladding members 1021, 1022, 1023, 1024 of the covering assembly 10 may be pre-mounted on the roof window 1 or be mounted after the mounting of the flashing members 1011, 1012, 1013, 1014. This is not essential to the present invention and will therefore not be described in further detail here.

Figure 2:
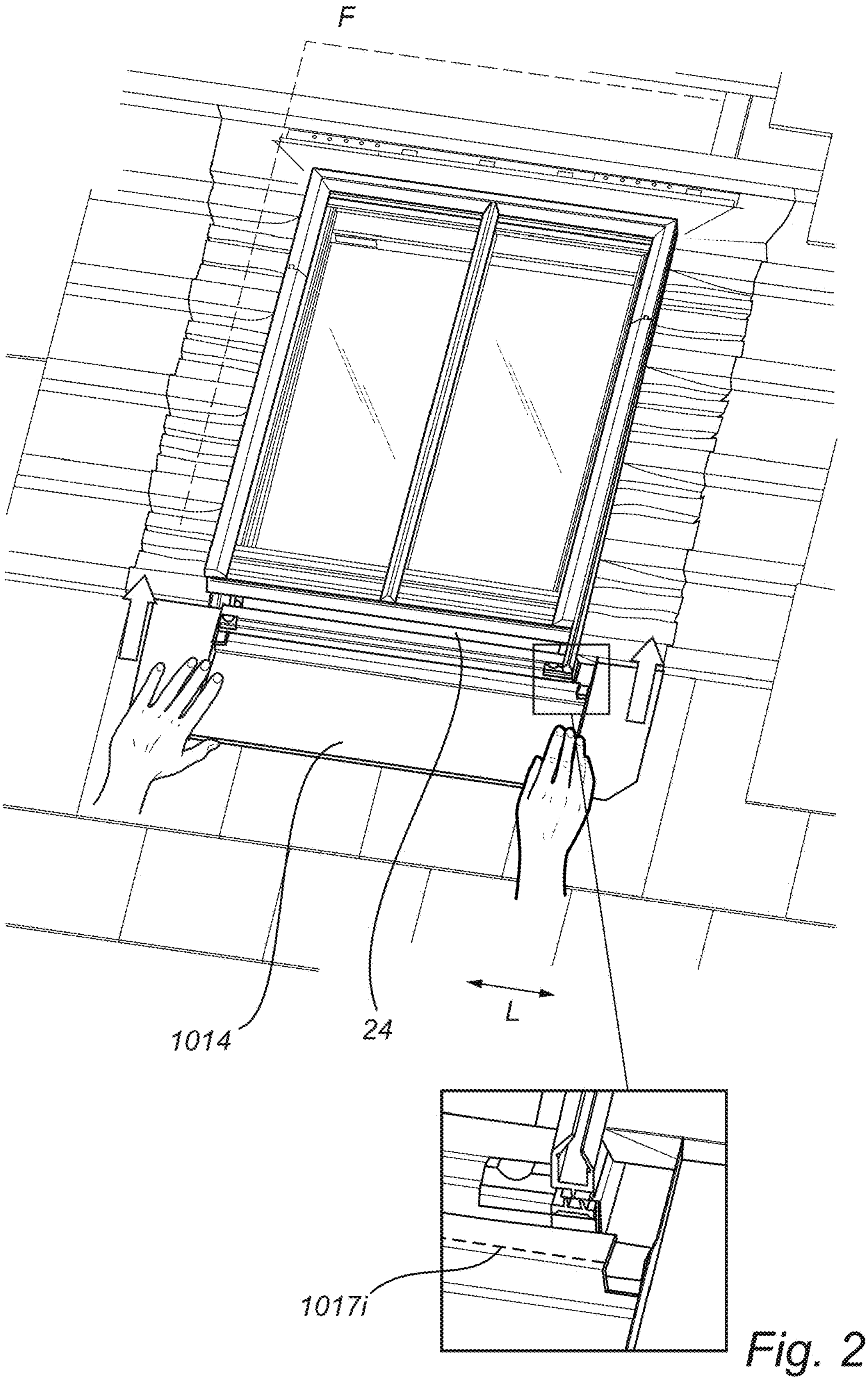
FIG. 2 is a perspective view of a roof window mounted in a roof structure and showing the mounting of a bottom flashing member, FIG. 3 corresponds to FIG. 2 but showing the subsequent mounting of side flashing members.

The mounting of the flashing members 1011, 1012, 1013, 1014 starts with the mounting of the bottom flashing member 1014 and as shown in FIG. 2 it is displaced in a direction parallel to the frame plane F and perpendicular to the length direction L of the bottom frame member 24.

Figure 3:
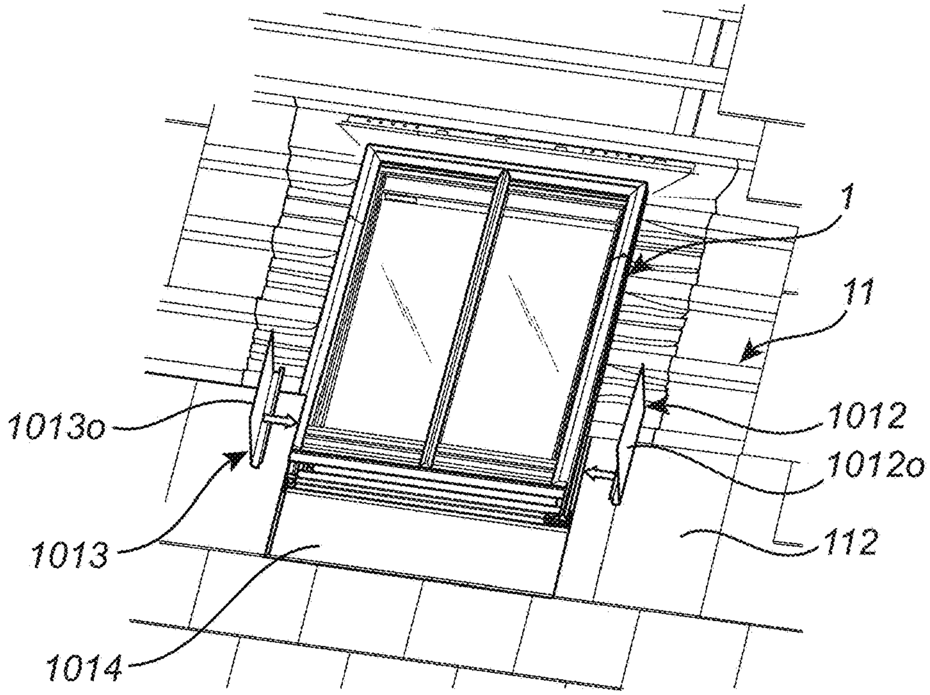

Hereafter, the side flashing members 1012, 1013 are mounted by being displaced in a similar manner as shown in FIG. 3. In the embodiment shown, several side flashing members 1012, 1013 are used at each side of the roof window 1, but it is to be understood that the invention also applies to roof windows wherein the covering assembly 10 only comprises two side flashing members, one at each side of the roof window 1.

Figure 4:
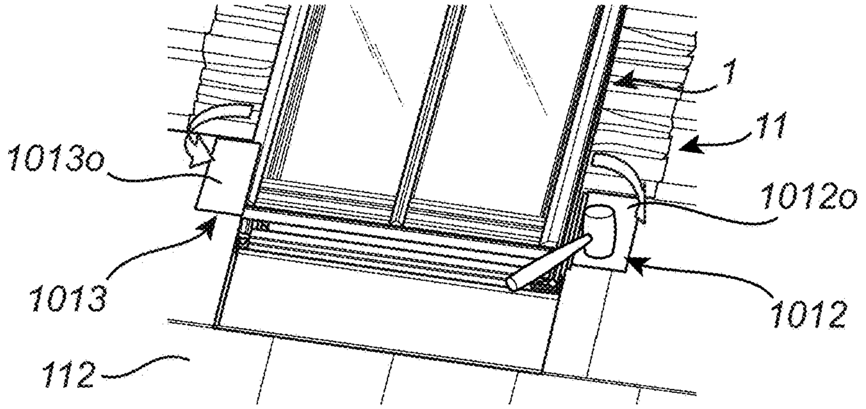
FIG. 4 is a perspective view showing a further stage of the mounting of the side flashing members.
Figure 5:
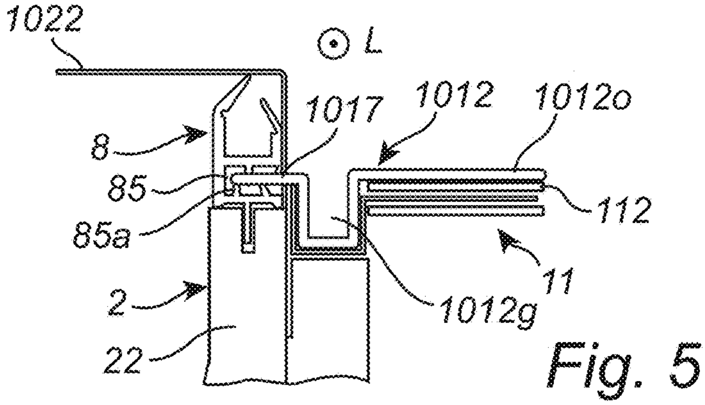
FIG. 5 is a cross-sectional view showing the right-hand side flashing member in the mounted state, FIG. 6 corresponds to FIG. 3 but showing the subsequent mounting of a top flashing member.

The side flashing members 1012, 1013 shown in FIG. 3 are initially mounted in a state in which an outer section 10120, 10130 configured for resting on the roof structure 11 is in an upright position, and the outer section 10120, 10130 is then folded down onto the roofing material 112 as shown in FIG. 4, ending up with having the shape shown in FIG. 5. This embodiment is particularly well suited for use with flat roofing materials, such as slate, whereas flashing members used with undulating roofing materials, such as tiles, will typically project underneath the roofing material and will therefore typically be mounted without such a folding down step. The folding down may, however, also be used for adapting the shape of the side flashing member to the shape of a roof structure supporting an undulating roofing material.

As may be seen in FIG. 5, a flange 1017 on the side flashing member 1012 has been inserted in a flashing reception groove 85 in an interface unit 8 of the frame 2, and it is to be understood that both the interface unit 8 and the flashing reception groove 85 therein extend in the length direction L of the side frame member 22. Inside the flashing reception groove 85, elastic protrusions 85*a* engage with sides of the flange 1017, thereby contributing to keeping it in place in the flashing reception groove 85. In addition to providing friction against the flange 1017, the protrusions 85*a* may also serve a sealing function. An interface unit of this type is shown in more detail in FIG. 11.

Figure 6:
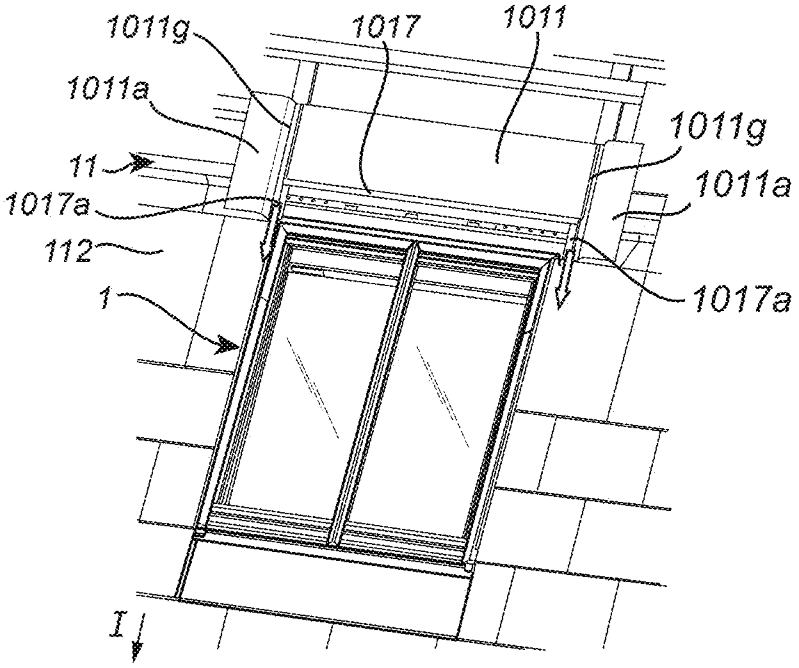

Turning now to FIG. 6, the mounting of the top flashing member 1011 is shown. As may be seen, it is mounted in the same way as described with reference to the bottom flashing member 1014 in the description of FIG. 2, only displacing it downwards instead of upwards as seen in the direction of inclination I of the roof structure 11.

Figure 7:
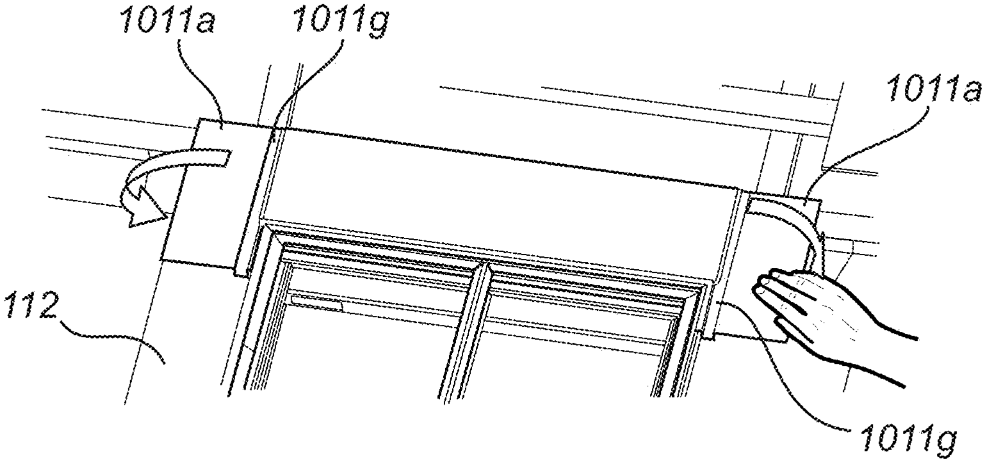
FIG. 7 is a perspective view showing a further stage of the mounting of the top flashing member.

As shown in FIG. 7 the corner sections 1011*a* are subsequently folded down onto the roofing material 112 as described with reference to the outer sections of the side flashing members in FIG. 3. In FIG. 7, the folding is shown as being done by hand, but it could also be done using a tool as shown in FIG. 3.

As is best seen in FIG. 5, the side flashing members 1012, 1013 comprises a gutter 1012*g* extending in the length direction L and similar gutters 1011*g*, see FIGS. 6 and 7, are found in the top flashing member 1011 delimiting each of the corner sections 1011*a*. In the mounted state, these gutters 1011*g*, 1012*g* extend in continuation of each other and allow water to be drained down along the sides of the roof window 1.

Figure 8:
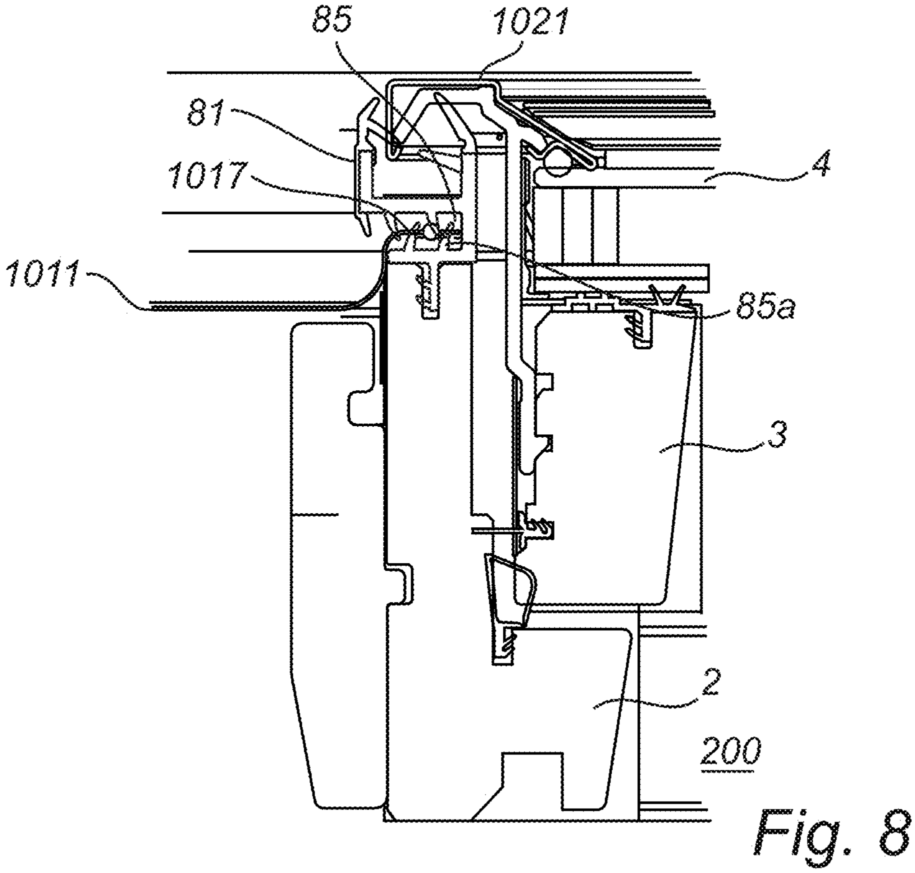
FIG. 8 is a cross-sectional view along the line VIII-VIII in FIG. 1.
Figure 9:
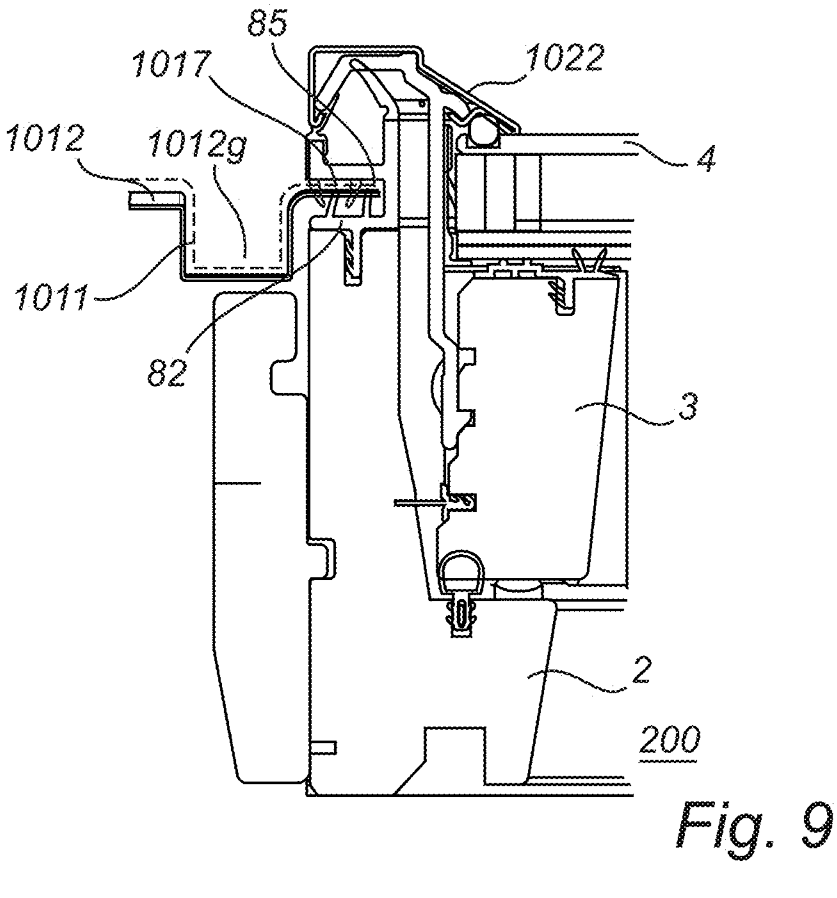
FIG. 9 is a cross-sectional view along the line IX-IX in FIG. 1, FIG. 10 corresponds to FIG. 8, but showing a different embodiment in a perspective view.

Referring now also to FIG. 8, the displacement of the top flashing member 1011 results in a flange 1017 being inserted in a top element 81 of the interface unit 8 also shown in FIG. 5. As may be seen by comparison to FIG. 9 showing the side of the same roof window 1, the top element 81 of the interface unit 8 is slightly different from the side element 82 of the interface unit 8, but both have the same overall structure with a flashing reception groove 85 receiving the flange 1017.

The flashing reception groove 85 in the side element 82 of the interface unit 8 is slightly higher than the flashing reception groove 85 in the top element 81. This allows side flashing members 1012, 1013 to overlap as shown in FIG. 1 and further allows corner flanges 1017*a* on the corner sections 1011*a* to extend into the flashing reception groove 85 of the side elements 82 of the interface unit 8 overlapping with the flange of a side flashing member as indicated by the broken line 1011 in FIG. 9.

While not shown it is to be understood that the bottom flashing member 1014 may also comprise a flange, which is inserted in a flashing reception groove 85 in an interface unit 8 as described with reference to the top and side flashing members 1012, 1013 above, and that the bottom flashing member 1014 may also have corner flanges 1017*a* as described for the top flashing member 1011.

It is further to be understood that while the drawing shows only embodiments, wherein the flashing reception groove 85 is formed in an interface unit 8 of the frame 2, it is also possible to insert the flange 1017 and corner flange 1017*a* in flashing reception grooves in for example a wooden frame member or in a frame member made by extrusion. If the flashing reception groove is made in a wooden frame, it may be advantageous for the protrusions to have a sealing function thus preventing moisture from entering into the flashing reception groove.

Figure 10:
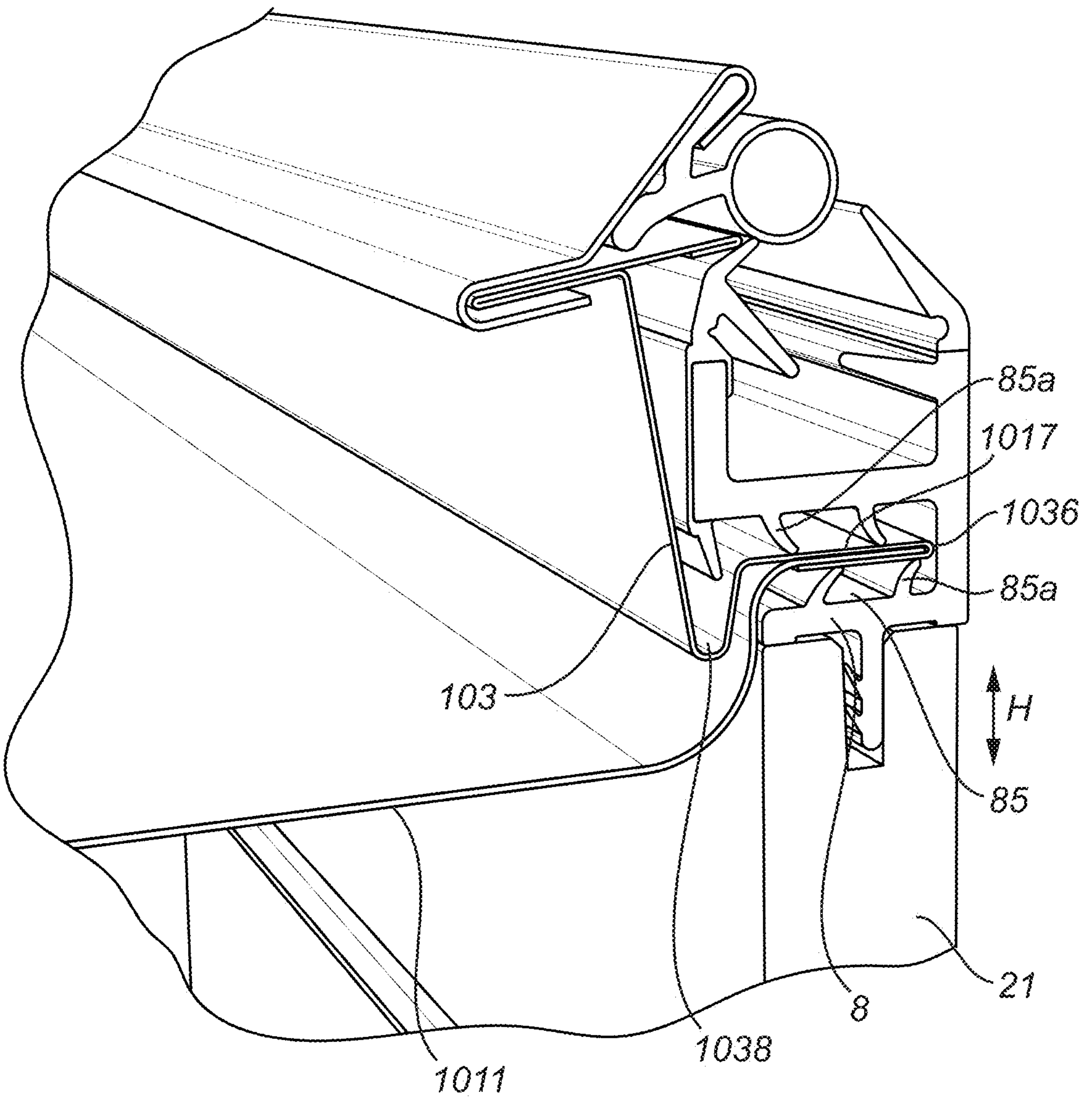

FIG. 10 is a cross-sectional view corresponding to that in FIG. 8, but showing a more complex top flashing member 1011 with a diverter rail 103 attached to it and showing only the top frame member 21 and the interface unit 8 of the roof window. As may be seen, the diverter rail has a bent edge 1036 fitting over the flange 1017 on the top flashing member, but it might also be a flange of the diverter rail fitting into a bent edge of the top flashing member. This results in that the thickness of the material inserted in the interface unit is bigger than in FIG. 9, where only two single layer flanges were overlapping. Here three layers of aluminium, each having a thickness of 0.47 mm are used, resulting in a total thickness of 1.4 mm and the total height of the flashing reception groove in the height direction H is 7 mm.

As is seen in FIG. 10, the insertion of the flange 1017 and the diverter rail 103 in the flashing reception groove 85 results in that the protrusions 85 are forced inwards and bends towards the end wall 86 of the flashing reception groove. If the protrusions were longer, sides of the protrusions would come into contact with the flange. This will of course also be the case in the other embodiments, even though the protrusions are shown in their undeformed state in FIGS. 5, 8 and 9, and will apply also where there is no diverter rail or where the flashing member is embodied differently than what is shown in the drawing.

In addition to depending on the size of the protrusions, the degree of deformation of the protrusions will depend on the thickness of the inserted material, and the protrusions are therefore deformed more in FIG. 10 than they would be if only a single layer was inserted as shown in FIGS. 5 and 8 or if two layers were inserted as in FIG. 9. In the embodiment in FIG. 10, the total thickness of the inserted material constitutes 20% of the total height of the flashing reception groove 85, and each protrusion 85*a* extends over 63% of the total height of the flashing reception groove in the undeformed state.

Figure 11:
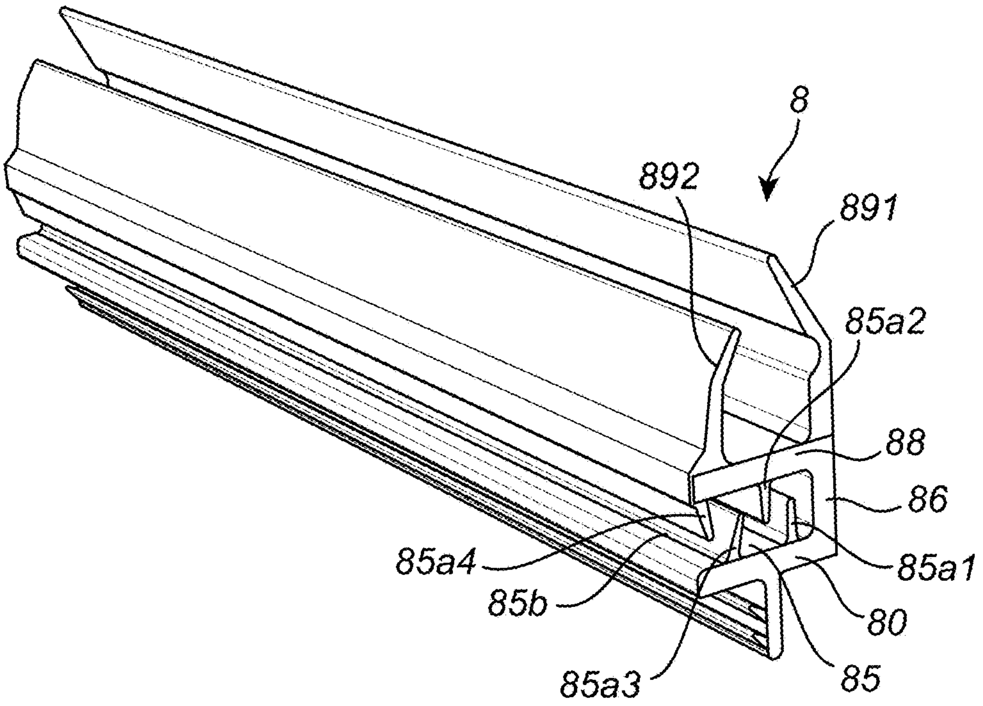
FIG. 11 is perspective view of an interface unit.
Figure 12:
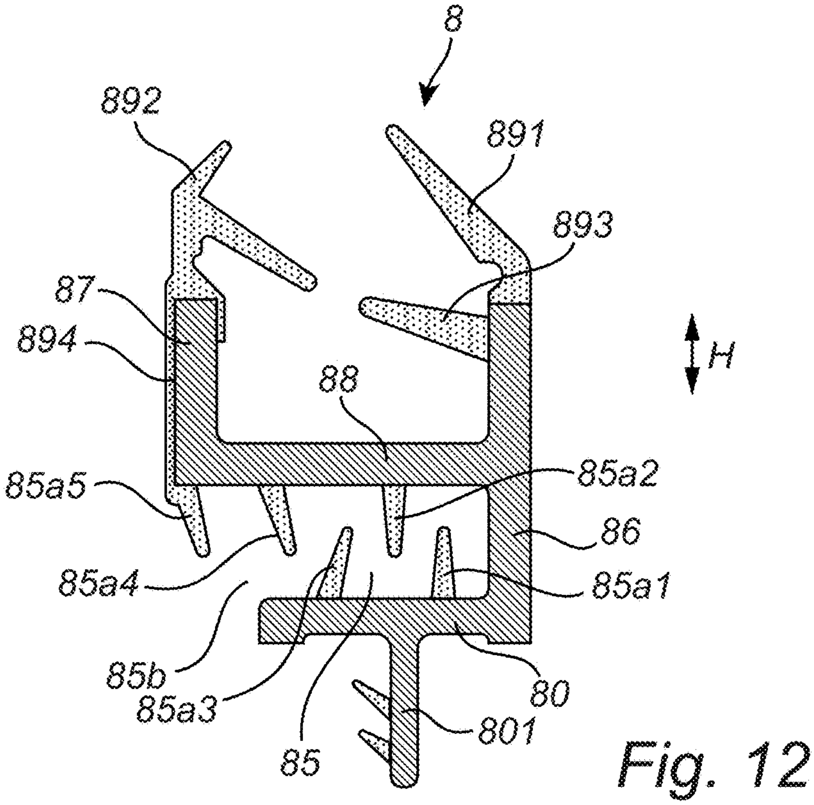
FIG. 12 is an end view of an interface unit.

An interface unit 8 as in FIG. 5 is shown in more detail in FIG. 11 and a cross-sectional of the interface unit in FIG. 10 is shown in FIG. 12. In both cases four protrusions 85*a*1, 85*a*2, 85*a*3, 85*a*4 are shown in their undeformed state and extend over more than half of the distance between the lower wall 80 and the upper wall 88, i.e. over more than half of the height of the flashing reception groove 85 measured perpendicular to the frame plane.

Two protrusion 85*a*1 and 85*a*3 are provided on the lower wall 80 and the two protrusions 85*a*2 and 85*a*4 are provided on the upper wall 88, thus providing substantially the same pressure from both sides, when the flange of the flashing member is inserted. In FIG. 12 a further protrusion 85*a*5 is provided on the upper wall. This 85*a*5 protrusion may also come into contact with the flashing member, but in the embodiment shown in FIG. 10 this protrusion serves to deflect water away from the flashing reception groove 85 and into a drainage gutter 1038 of the diverter rail 103.

The two innermost protrusions 85*a*1 and 85*a*2 of the interface units 8 in FIG. 11 and FIG. 12 extend in the height direction H, substantially parallel to each other and perpendicular to the upper and lower walls, whereas the outermost protrusion 85*a*3-85*a*5 are inclined with substantially the same inclination away from the groove opening 85*b*. This may facilitate insertion of the flange by the resistance to insertion increasing gradually. It is also envisaged that the inclination of the protrusions may decrease gradually with the distance from the groove opening **85*b*** so that the outermost protrusion has the largest inclination, and/or that all protrusions may be inclined. The considerations regarding inclination of the protrusions apply to all embodiments of the interface unit.

In FIG. 11 the protrusions **85*a* are shown as lips extending over the entire length of the interface unit, but it is to be understood that they could be shorter, possibly even having a cone-shape, such that each of the protrusions shown in FIG. 12 presents a row of cone-shaped protrusions. A brush- or comb-like structure with a continuous attachment to the upper and lower walls 80, 88** from which a series of bristle- or rod-like structures project would also be possible.

The protrusions **85*a* are preferably made from a material allowing them to yield when coming into engagement with the flange as shown in FIG. 10, whereas the parts 80, 86, 88 delimiting the flashing reception groove 85 are advantageously made from a dimensionally stable material, so that they maintain their shape during insertion of the flange 1017**.

In all of the embodiments shown, the interface units 8 further comprise sealing lips 891, 892, 893, these reference numbers having been added only in FIG. 11 and FIG. 12 for the sake of clarity of the drawing. These sealing lips may be made from the same material as the protrusions or from one or more different materials depending on the sealing requirements. Sealing lips are not linked to the reception of the flanges 1017 of the flashing members in the flashing reception groove 85 and are therefore not necessary to the invention.

In FIG. 12 parts of the interface unit made from a soft material, i.e. the protrusions **85*a* and the sealing lips 891, 892, 893, are indicated with a dotted pattern, and parts 80, 86, 87, 88 made from a dimensionally stable material are indicated with hatching. Even though made from different materials, they form a coherent monolithic structure, being made by co-extrusion. The protrusion 85*a*5 at the groove opening 85*b* and the sealing lip 892 above it are here interconnected by a thin layer 894 covering an upwards wall 87 of the dimensionally stable material. As may be seen from FIG. 8 and FIG. 9, the upwards wall 87** is the only part of the interface unit, which will be exposed in the mounted state and by covering it, the dimensionally stable may be made from a wider range of materials, which do not necessarily have a good resistance to weather-related effects such as exposure to ultraviolet radiation.

Interconnecting the protrusion **85*a*5 and the sealing lip 892** may further contribute to reducing the risk of them coming loose, for example due to mechanical action.

Components of the roof window 1 are easily disassembled and each component may in principle be reused, be recycled by appropriate environmentally responsible disposal means, or the material be recovered for other uses.

LIST OF REFERENCE NUMERALS

1 Roof window
10 Covering assembly
1011 Top flashing member
**1011*a*** corner section
**1011*g*** Gutter
1012 Side flashing member
**1012*g*** Gutter
**1012*o*** Outer side of side flashing member
1013 Side flashing member
**1013*o*** Outer side of side flashing member
1014 Bottom flashing member

1017 Flange
**1017*a*** corner flange
**1017*i*** Marking
1021 Cladding member
1022 Cladding member
1023 Cladding member
1024 Cladding member
11 Roof structure
112 Roofing material
2 Frame
200 Frame opening
21 Top frame member
22 Side frame member
23 Side frame member
24 Bottom frame member
3 Sash
4 Pane
8 Interface unit
80 Lower wall
801 Anchor section
81 Top element of interface unit
82 Side element of interface unit
85 Flashing reception groove
**85*a*** Protrusion
**85*b*** Groove opening
86 End wall
88 Upper wall
891 Inner sealing lip
892 Outer sealing lip
892 Additional inner sealing lip
F Frame plane
I Direction of inclination
L Length direction

The invention claimed is:

1. A roof window for being mounted in a roof structure having a roofing material and a covering assembly, said roof window comprising a frame and a sash carrying a pane, where the frame comprises a plurality of frame members together defining a frame opening and a frame plane, wherein the plurality of frame members includes a top frame member, a bottom frame member and two side frame members and the frame plane passes through each of the top frame member, the bottom frame member and the two side frame members, and each frame member extends in a length direction, where the frame comprises an interface unit extending in the length direction of at least one frame member, and where the interface unit comprises a flashing reception groove configured for receiving a flange of at least one flashing member of the covering assembly via a groove opening by insertion in a direction parallel to the frame plane, said flashing reception groove extending in the length direction of the frame member, wherein a width axis of said flashing reception groove passing through the groove opening and a portion of the interface unit opposite the groove opening extends parallel to the frame plane when the roof window is installed, where one or more protrusions are provided in the flashing reception groove for engagement with the flange of at least one flashing member, and wherein the protrusion(s) is/are made by co-extrusion with one or more parts of the interface unit delimiting the flashing reception groove and that the flange of at least one flashing member comprises a marking indicating an intended insertion depth of the flange into the flashing reception groove.

2. A kit comprising a roof window, which is configured for being mounted in a roof structure comprising a roofing material and a covering assembly, said roof window comprising a frame and a sash carrying a pane, where the frame comprises a plurality of frame members together defining a frame opening and a frame plane, wherein the plurality of frame members includes a top frame member, a bottom frame member and two side frame members and the frame plane passes through each of the top frame member, the bottom frame member and the two side frame members, and each frame member extends in a length direction, where the frame comprises an interface unit extending in the length direction of at least one frame member, where said covering assembly comprises a plurality of flashing members configured for covering a joint between the frame and the roof structure, and where the interface unit comprises a flashing reception groove configured for receiving a flange of at least one flashing member via a groove opening by insertion in a direction parallel to the frame plane, said flashing reception groove extending in the length direction of the frame member, wherein a width axis of said flashing reception groove passing through the groove opening and a portion of the interface unit opposite the groove opening extends parallel to the frame plane when the roof window is installed, and where one or more protrusions are provided in the flashing reception groove for engagement with the flange(s), wherein the protrusion(s) is/are made by co-extrusion with one or more parts of the interface unit delimiting the flashing reception groove and that the flange of at least one flashing member comprises a marking indicating an intended insertion depth of the flange into the flashing reception groove.

3. The kit according to claim 2, where the interface unit including the protrusion(s) constitutes a monolithic structure.

4. The kit according to claim 2, where the protrusion(s) extend(s) in the length direction.

5. The kit according to claim 2, where the protrusion(s) is/are made from a material having a Shore A hardness of 20 A-95 A.

6. The kit according to claim 2, where the protrusion(s) is/are made from one or more thermoplastic elastomers (TPE).

7. The kit according to claim 2, where at least the one or more parts of the interface unit delimiting the flashing reception groove are made of polypropylene (PP) mixed with glass fibres.

8. The kit according to claim 2, where the/each protrusion extends over more than half of the height of the flashing reception groove measured perpendicular to the frame plane.

9. The kit according to claim 2 comprising at least three protrusions, and where one or more protrusion(s) extend(s) from each of two opposite sides of the flashing reception groove.

10. The kit according to claim 2, where at least one protrusion has a tapered cross-sectional shape with a minor dimension at a free edge.

11. The kit according to claim 2, where at least one protrusion is inclined in a direction away from the groove opening of the flashing reception groove.

12. The kit according to claim 2, where the total thickness of the flange(s) inserted into the flashing reception groove constitutes less than 50% of the height of the flashing reception groove measured perpendicular to the frame plane.

13. The kit according to claim 2, wherein the at least one flashing member is a top flashing member, the flange of which extends into the flashing reception groove of a top element of the interface unit, and wherein the top flashing member comprises a corner section at one or both ends seen in the length direction, said corner section extending along a side frame member of the frame in the mounted state.

14. The kit according to claim 13, wherein the corner section comprises a corner flange extending into the flashing reception groove of a side element of the interface unit.

15. The according to claim 2, further comprising a plurality of cladding members covering a part of the sash.

16. A method for mounting a roof window in a roof structure comprising a roofing material, said roof window comprising a frame and a sash carrying a pane, and said frame comprising a plurality of frame members together defining a frame opening and a frame plane and each extending in a length direction, wherein the plurality of frame members includes a top frame member, a bottom frame member and two side frame members and the frame plane passes through each of the top frame member, the bottom frame member and the two side frame members, wherein said method comprises the steps of A) arranging the roof window in an opening in the roof structure, B) arranging a plurality of flashing members to cover a joint between the frame of the roof window and the roof structure by displacing the flashing member in a direction parallel to the frame plane thereby inserting a flange of at least one flashing member in a flashing reception groove in an interface unit on the frame via a groove opening of the flashing reception groove, a width axis of said flashing reception groove passing through the groove opening and a portion of the interface unit opposite the groove opening extends parallel to the frame plane, said interface unit and said flashing reception groove both extending in the length direction of the frame member, wherein during step B) the flange(s) comes into engagement with one or more protrusions in the flashing reception groove, said protrusion(s) being made by co-extrusion with parts of the interface unit delimiting the flashing reception groove, and that the flange of at least one flashing member comprises a marking, and that the displacing of the flashing member is continued until the flange is inserted so deep in the flashing reception groove that the marking reaches or is hidden by the interface unit.

17. The method according to claim 16, wherein, for the insertion of the flange in the flashing reception groove, the flashing member is displaced in a direction substantially perpendicular to the length direction.

18. The method according to claim 17, wherein the at least one flashing member is a top flashing member comprising a corner section at one or both ends seen in the length direction, said corner section extending along a side frame member of the frame in the mounted state and comprising a corner flange extending perpendicular to the length direction of the top flashing member, and wherein the corner flange is inserted into the flashing reception groove of a side element of the interface unit by displacement perpendicular to the length direction of the top flashing member.

19. The kit according to claim 2, where the protrusion(s) is/are made from a material having a Shore A hardness of 35 A-87 A.

20. The kit according to claim 2, where at least the one or more parts of the interface unit delimiting the flashing reception groove are made of polypropylene (PP) mixed with glass fibres, said glass fibres constituting 15% by weight.

21. The kit according to claim 2, where the total thickness of the flange(s) inserted into the flashing reception groove constitutes less than 25% of the height of the flashing reception groove measured perpendicular to the frame plane.

* * * * *